United States Patent
Fujita et al.

(10) Patent No.: US 9,785,618 B2
(45) Date of Patent: Oct. 10, 2017

(54) PHOTO-BASED EMAIL ORGANIZATION

(71) Applicant: INTERNATIONAL BUSINESS MACHINES CORPORATION, Armonk, NY (US)

(72) Inventors: Masaya Fujita, Tokyo (JP); Gautam Majumdar, Wappingers Falls, NY (US); James Moffitt, Milburn, NJ (US); Michael Q. Wang, Irving, TX (US); Fumiyoshi Yamada, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 14/227,102

(22) Filed: Mar. 27, 2014

(65) Prior Publication Data

US 2015/0278161 A1    Oct. 1, 2015

(51) Int. Cl.
| | |
|---|---|
| G06Q 10/10 | (2012.01) |
| G06F 3/0481 | (2013.01) |
| G06T 3/40 | (2006.01) |
| G06F 17/21 | (2006.01) |

(52) U.S. Cl.
CPC .......... G06F 17/211 (2013.01); G06F 3/0481 (2013.01); G06Q 10/10 (2013.01); G06Q 10/107 (2013.01); G06T 3/40 (2013.01); G06T 2200/24 (2013.01)

(58) Field of Classification Search
CPC .... G06Q 10/107; G06Q 10/10; G06F 3/0481; G06F 3/048; H04L 51/00; H04L 29/06; G06T 11/206
See application file for complete search history.

(56) References Cited

U.S. PATENT DOCUMENTS

| | | | | |
|---|---|---|---|---|
| 5,579,472 | A * | 11/1996 | Keyworth, II | G06F 3/0481 340/7.29 |
| 7,213,206 | B2 * | 5/2007 | Fogg | G06Q 10/10 715/706 |
| 8,141,002 | B2 * | 3/2012 | Moses | H04L 41/22 715/772 |
| 8,413,059 | B2 | 4/2013 | Lee et al. | |
| 8,489,684 | B2 | 7/2013 | Adams et al. | |
| 2004/0243679 | A1 * | 12/2004 | Tyler | G06Q 10/107 709/206 |
| 2005/0097176 | A1 * | 5/2005 | Schatz | H04L 12/5875 709/206 |
| 2005/0193077 | A1 * | 9/2005 | Nakai | G06Q 10/107 709/206 |

(Continued)

FOREIGN PATENT DOCUMENTS

| | | |
|---|---|---|
| WO | 2011062718 A3 | 5/2011 |
| WO | 2013173648 A2 | 11/2013 |

*Primary Examiner* — Kieu Vu
*Assistant Examiner* — Blaine T. Basom
(74) *Attorney, Agent, or Firm* — John R. Pivnichny; Law Office of Jim Boice

(57) ABSTRACT

A method, system, and/or computer program product manages electronic mail (e-mail). An e-mail Graphical User Interface (GUI) depicting photos of e-mail users is generated, such that the photos in the e-mail GUI depict e-mail users, and wherein the e-mail GUI is displayed to a system user. A visual cue is appended to at least one photo in the e-mail GUI, wherein the visual cue describes how many e-mails between a photo-depicted e-mail user and the system are unread.

19 Claims, 6 Drawing Sheets

(56) References Cited

U.S. PATENT DOCUMENTS

| | | | |
|---|---|---|---|
| 2005/0267944 A1* | 12/2005 | Little | G06Q 10/107 709/207 |
| 2005/0268237 A1* | 12/2005 | Crane | G06F 3/0481 715/732 |
| 2008/0030496 A1* | 2/2008 | Lee | G06Q 10/10 345/418 |
| 2008/0126951 A1 | 5/2008 | Sood et al. | |
| 2008/0162649 A1* | 7/2008 | Lee | H04L 51/32 709/206 |
| 2008/0270560 A1* | 10/2008 | Tysowski | H04L 51/14 709/207 |
| 2009/0144655 A1* | 6/2009 | Hardy | H04L 51/22 715/803 |
| 2009/0248602 A1 | 10/2009 | Frazier | |
| 2010/0115426 A1* | 5/2010 | Liu | G06Q 10/107 715/757 |
| 2010/0313140 A1 | 12/2010 | Bank et al. | |
| 2011/0010182 A1* | 1/2011 | Turski | G06Q 10/107 705/1.1 |
| 2012/0030623 A1* | 2/2012 | Hoellwarth | G06F 3/04817 715/811 |
| 2012/0110052 A1* | 5/2012 | Smarr | G06Q 10/10 709/201 |
| 2012/0221961 A1* | 8/2012 | Reynolds | H04L 51/12 715/752 |
| 2013/0080954 A1* | 3/2013 | Carlhian | H04M 1/274583 715/769 |
| 2014/0273926 A1* | 9/2014 | Wester | G06Q 10/107 455/405 |
| 2015/0261387 A1* | 9/2015 | Petersen | G06F 3/013 715/765 |

\* cited by examiner

PHOTO-BASED EMAIL ORGANIZATION

BACKGROUND

The present disclosure relates to the field of computers, and specifically to the use of computers used in electronic mail (e-mail). Still more particularly, the present disclosure relates to managing received e-mails.

Electronic mail (e-mail) is a system of sending messages from a sender to a recipient, thus allowing persons to communicate electronically over a network such as the Internet. E-mail provides an advantage over other forms of communication in that the sender does not have to be at his/her computer when the e-mail is sent. Rather, e-mail messages are stored on e-mail servers, and then delivered to an "inbox" of an e-mail program being used by the addressee/recipient of the e-mail.

E-mails are sent to a specific address of the intended recipient, typically in the format of "Recipient Name @ domain name". However, e-mail addresses are often shared, wittingly or unwittingly, with very large numbers of e-mail users. This often results in a user's e-mail "inbox" being filled with an unmanageable number of e-mails, including important e-mails that are often overlooked by the recipient.

SUMMARY

A method, system, and/or computer program product manages electronic mail (e-mail). An e-mail Graphical User Interface (GUI) depicting photos of e-mail users is generated, such that the photos in the e-mail GUI depict e-mail users, and wherein the e-mail GUI is displayed to a system user. A visual cue is appended to at least one photo in the e-mail GUI, wherein the visual cue describes how many e-mails between a photo-depicted e-mail user and the system are unread.

DETAILED DESCRIPTION

Figure 1:
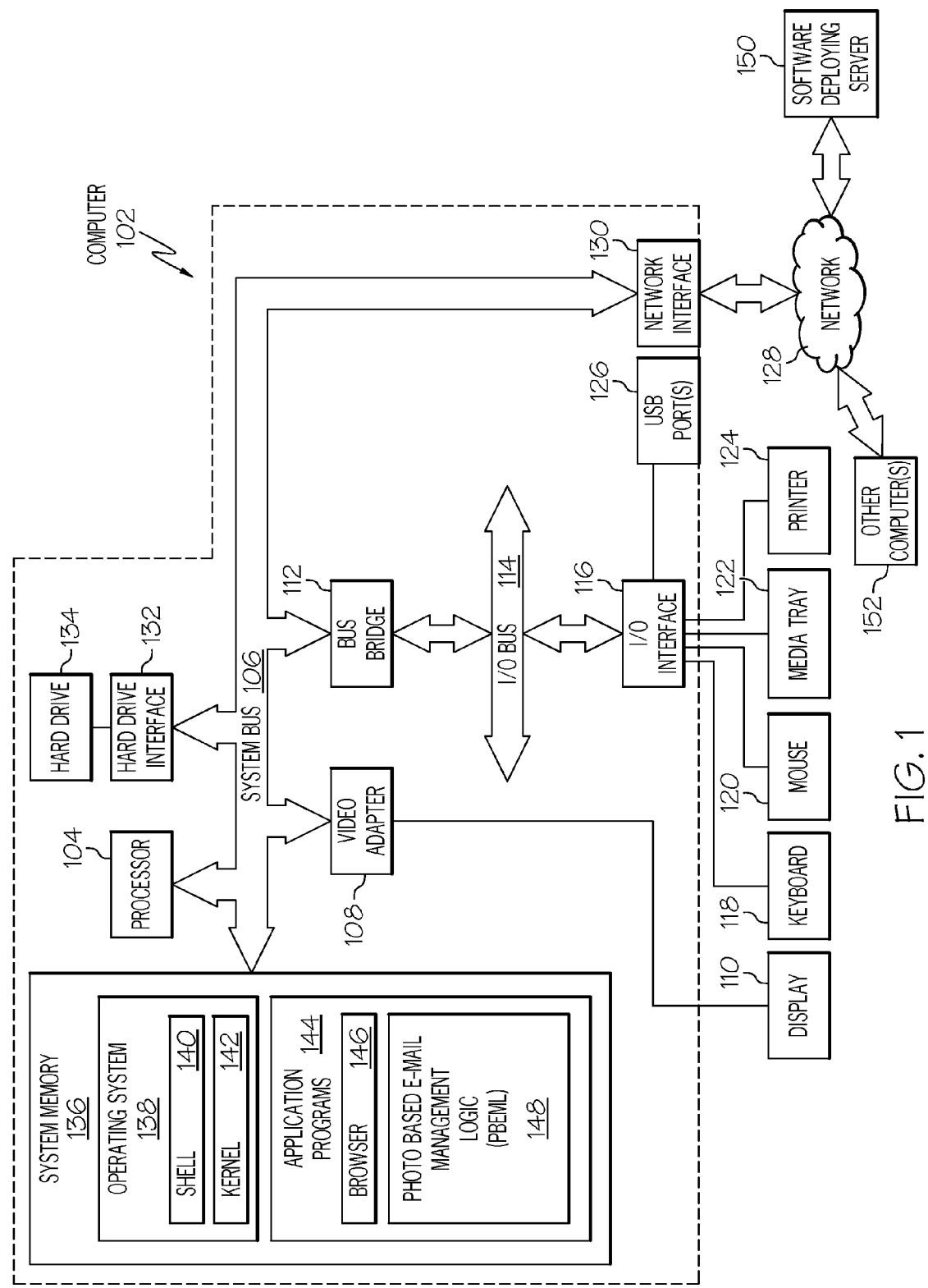
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or other computer(s) 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Photo Based E-mail Management Logic (PBEML) 148. PBEML 148 includes code for implementing the processes described below, including those described in FIGS. 2-6. In one embodiment, computer 102 is able to download PBEML 148 from software deploying server 150, including in an on-demand basis, wherein the code in PBEML 148 is not downloaded until needed for execution. Note further that, in one embodiment of the present invention, software deploying server 150 performs all of the functions associated with the present invention (including execution of PBEML 148), thus freeing computer 102 from having to use its own internal computing resources to execute PBEML 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Note also that computer 102 and/or other computer(s) 152 also include an e-mail program (not depicted), which enables computer 102 and other computer(s) 152 to exchange e-mail messages. In one embodiment, a system user (i.e., a person who is using an e-mail GUI such as that depicted in FIG. 3) utilizes computer 102, while the other computer(s) 152 depicted in FIG. 1 are used by persons whose photos are presented in the e-mail GUI depicted in FIG. 3.

Figure 2:
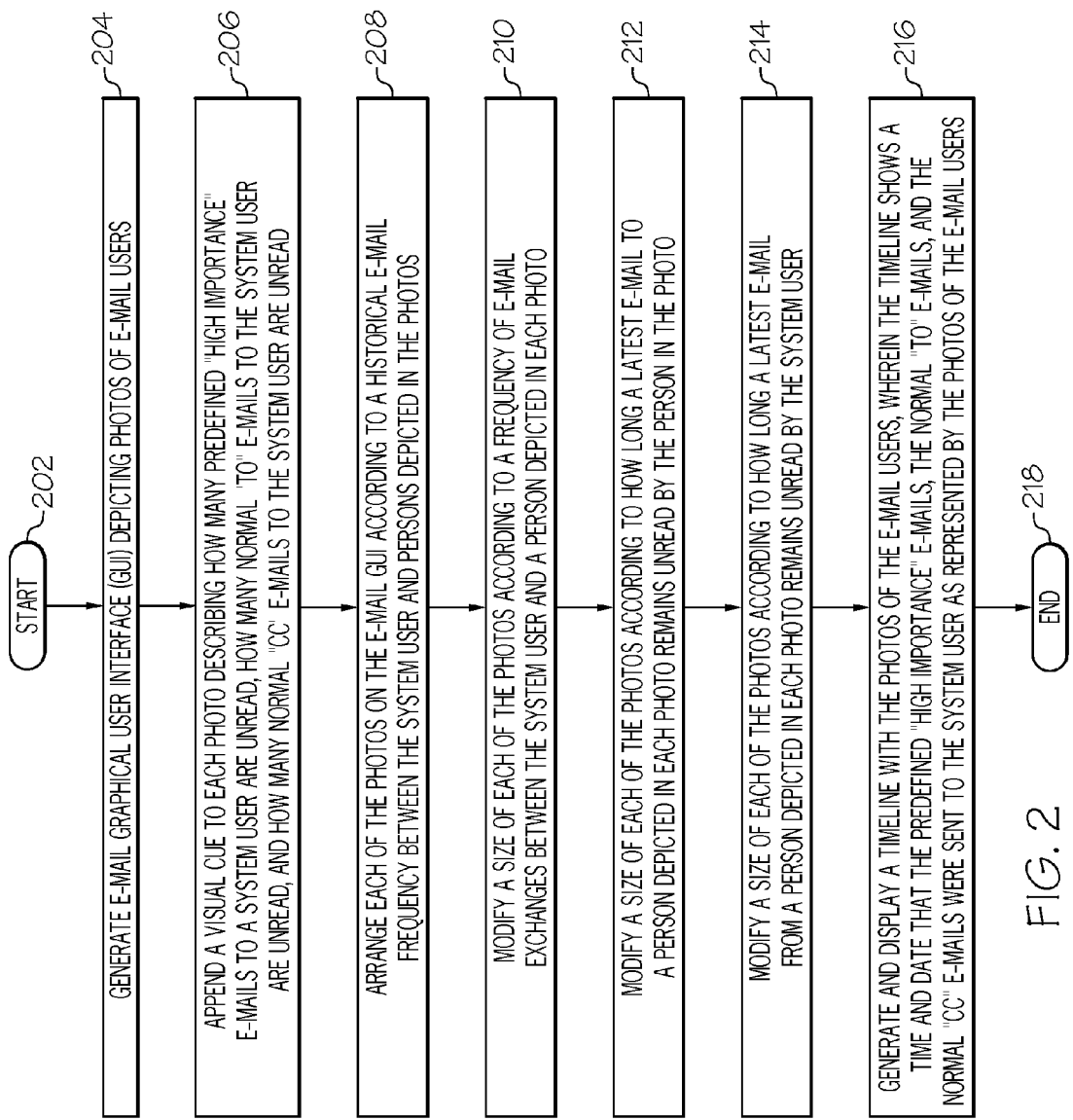
FIG. 2 is a high-level flowchart of one or more steps performed by one or more processors to utilize photos of e-mail senders/recipients to manage a user's e-mail.

With reference now to FIG. 2, a high-level flowchart of one or more steps performed by one or more processors to incorporate the use of photos of e-mail senders/recipients to manage a system user's e-mail is presented. After initiator block 202, one or more processors generates an e-mail Graphical User Interface (GUI) depicting photos of e-mail users (block 204). The photos in the e-mail GUI depict e-mail users, and the e-mail GUI is displayed to a system user. For example, consider the exemplary e-mail GUI 300 depicted in FIG. 3.

E-mail GUI 300 includes one or more areas (i.e., panes), such as the depicted configured area 302 and the unconfigured area 304. In both the configured area 302 and the unconfigured area 304 are multiple photos of e-mail users. However, in the configured area 302, the photos are arranged according to the role/relationship of the persons depicted in the photos. As illustrated in exemplary manner, some of the persons in the photos are executives of an enterprise that employs a person (i.e., the "system user") to whom the e-mail GUI 300 is being presented, while other persons in the photos are the managers of that person, and other persons in the photos are members of that person's community (e.g., social network). Within the unconfigured area 304 are photos of persons whose role/relationship to the system user are undefined, at least on the e-mail GUI 300.

Returning to FIG. 2, in block 206 one or more processors append a visual cue to at least one photo in the e-mail GUI. The visual cue describes how many e-mails between a photo-depicted e-mail user and the system are unread. For example, consider the photo 306 in FIG. 3. As described in legend 312, there are 6 e-mails of "high importance", 5 e-mails of normal "To", and 8 e-mails of normal "CC" (and/or "BCC") exchanged with the person depicted in photo 306 that are currently unread. In one embodiment, these exchanged e-mails are sent from the person depicted in photo 306 to the system user who is viewing the e-mail GUI 300; in another embodiment these exchanged e-mails are sent from the system user to the person depicted in photo 306; in another embodiment these exchanged e-mails are a combination of e-mails to the person depicted in photo 306 and from the person depicted in photo 306.

The "high importance" e-mails are those that have been predefined/predetermined to be of "high importance". In one embodiment, such "high importance" e-mails are indicated as such by a flag, color coding, etc. that indicates to the user that the e-mail has been designated, by the sender and/or an e-mail system, as having been classified as possessing a level of significance/importance that exceeds some predefined threshold. A normal "To" e-mail is an e-mail that 1) has not been flagged as "high importance", but 2) has been sent via the "To" field (i.e., in the field reserved for primary addressees of the e-mail) of an e-mail program. A normal "CC" (or "BCC") e-mail is an e-mail that 1) has not been flagged as "high importance", but 2) has been sent via the "CC" field or "BCC" field (i.e., in the field reserved for recipients who are not primary addressees of the e-mail) of an e-mail program.

Thus, in one embodiment of the present invention a first visual cue (e.g., visual cue 330 shown in FIG. 3) describes how many predefined "high importance" e-mails between the depicted e-mail user and the system user are unread; a second visual cue (e.g., visual cue 332 shown in FIG. 3) describes how many normal "To" e-mails between the depicted e-mail user and the system user are unread; and a third visual cue (e.g., visual cue 334 shown in FIG. 3) describes how many normal "CC" e-mails between the depicted e-mail user and the system user are unread.

Again, note that in one embodiment, the unread e-mails have been sent from the person depicted in the photo to a system user who is using/viewing the e-mail GUI 300. In one embodiment, the unread e-mails have been sent from a system user who is using/viewing the e-mail GUI 300 to the person depicted in the photo. In one embodiment, the unread e-mails are a combination of unread e-mails that have been sent from the person depicted in the photo to a system user who is using/viewing the e-mail GUI 300 plus unread e-mails have been sent from the system user who is using/viewing the e-mail GUI 300 to the person depicted in the photo.

Figure 3:
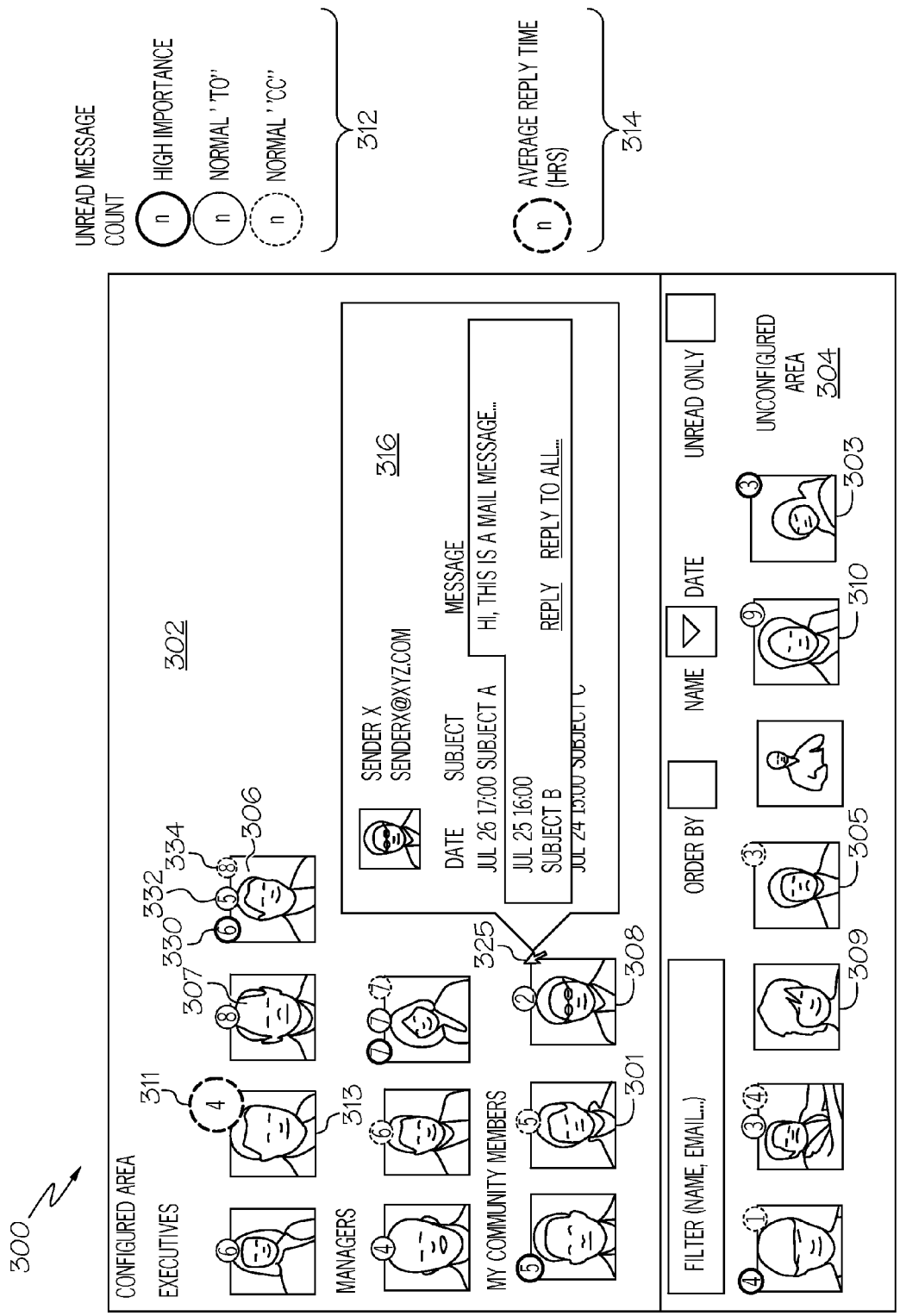
FIG. 3 illustrates an exemplary e-mail Graphical User Interface (GUI) in according with one or more embodiments of the present invention.

Note further in FIG. 3 that one or more of the photos also has an average reply time visual cue, such as the depicted average reply time visual cue 311 that has been appended to photo 313. As described in legend 314, the average reply time visual cue 311 depicts how many hours it takes, on average, for a reply to an e-mail to be sent to/from the person depicted in the photo 313. For example and as illustrated, the average reply time (based on a historical average amount of time) taken by the person depicted in a photo 313 to reply to and/or receive a reply from the system user is 4 hours. That is, in one embodiment, historical data reveals that the person depicted in photo 313 takes an average of 4 hours to reply to an e-mail message from the system user (not depicted) who is using the e-mail GUI 300. In another embodiment, historical data reveals that the system user (i.e., the person who is using the e-mail GUI 300) takes an average of 4 hours to reply to an e-mail message from the person depicted in photo 313. In another embodiment, historical data reveals that the system user and the person depicted in photo 313 combined take an average of 4 hours to reply to the other user/person's e-mail messages.

As depicted by pop-up window 316 in FIG. 3, hovering a cursor over a particular photo reveals all unread e-mails to/from the person depicted in that particular photo. For example, assume that there are two normal "To" e-mails that have been sent to the person in photo 308, but that they are still unread by that person. Hovering the cursor 325 over photo 308 shows details about the unread e-mails, including the time/date they were sent, their subjects (i.e., topics), the sender's name (i.e., either the person in the photo 308 as depicted or by the system user, not depicted), the message itself, and/or options to reply to the previously unread e-mail(s).

Returning now to FIG. 2, block 208 describes one or more processors arranging each of the photos on the e-mail GUI according to a historical e-mail frequency between the system user and persons depicted in the photos. That is, one or more processors determines an e-mail frequency between the e-mail users and the system user based on historical e-mail communication records, and then arranges each of the photos in the e-mail GUI according to a determined e-mail frequency between the system user and persons depicted in the photos. For example, consider FIG. 4, which depicts an e-mail GUI 400 (analogous to the e-mail GUI 300 in FIG. 3) that graphically represents a frequency of e-mail traffic between a user and one or more other e-mail users.

Figure 4:
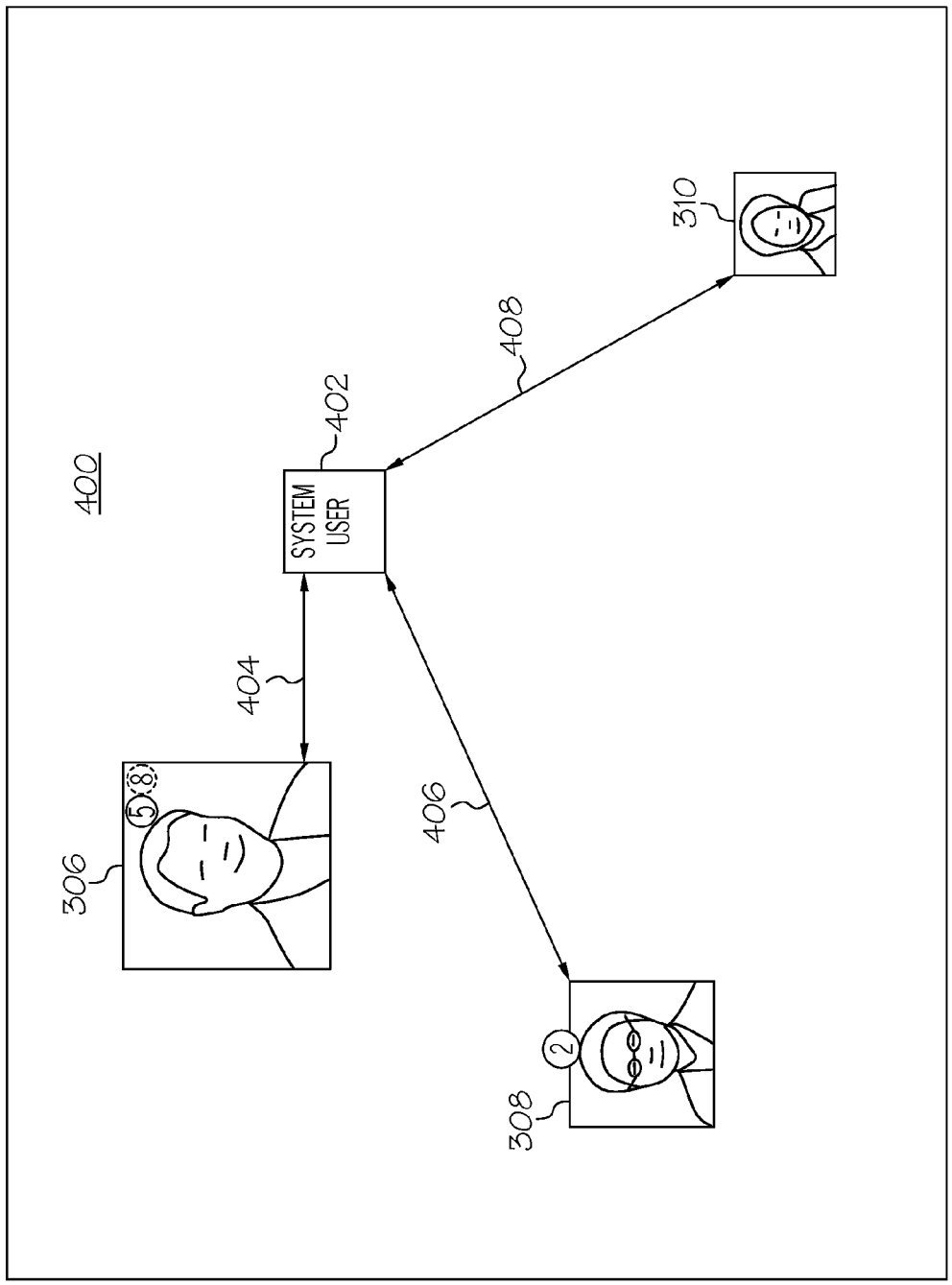
FIG. 4 depicts an e-mail GUI that graphically represents a frequency of e-mail traffic between a user and one or more other e-mail users.

In FIG. 4, assume that a system user 402 (i.e., the e-mail user who is able to see and utilize the e-mail GUI 400) has a history of e-mailing with three persons from e-mail GUI 300 in FIG. 3, depicted in both FIG. 3 and FIG. 4 in photos 306, 308, and 310. As indicated by the short line 404, there is a historical pattern of high e-mail traffic between the system user 402 and the person depicted in photo 306 (e.g., more than 10 e-mails per day are exchanged between the system user 402 and the person depicted in photo 306). In one embodiment, this high e-mail traffic is also represented by the enlargement of the photo 306, as compared with the size of the photo 306 found in the original e-mail GUI 300 in FIG. 3 (see block 210 in FIG. 2).

Similarly, there is a history of moderate e-mail traffic (e.g., 3 e-mails per day) between system user 402 and the person depicted in photo 308. Thus, line 406 is longer than line 404, indicating that the system user 402 has fewer e-mails per unit of time with the person in photo 308 than with the person in photo 306. Likewise, there is a history of light e-mail traffic (e.g., less than 2 e-mails per week) between system user 402 and the person depicted in photo 310. Thus, line 408 is longer than line 406, indicating that the system user 402 has even fewer e-mails with the person in photo 310 than with the person in photo 308, and thus there is an even more distant relationship between the system user 402 and the person depicted in photo 310. Note that in one embodiment, the sizes of the photos 308 and 310 are also adjusted (e.g., made proportionally smaller) according to the frequency of e-mails with system user 402.

The graphical representation of e-mail exchange frequency with different parties shown in FIG. 4 can be used in various ways. In one embodiment, e-mail GUI 400 is a standalone GUI, which is viewed to identify such e-mail frequencies. In another embodiment, the changes in sizes of the depicted photos are represented in the e-mail GUI 300 in FIG. 3. That is, the photos 306, 308, and 310 are now depicted in e-mail GUI 300 in FIG. 3 at their new sizes, thus indicating on e-mail GUI 300 the historical frequency of e-mails from the depicted persons and the system user. Thus, in one embodiment of the present invention, one or more processors modifies a size of each of the photos in the e-mail GUI according to a frequency of e-mail exchanges between the system user and a person depicted in said each of the photos in the e-mail GUI.

Figure 5:
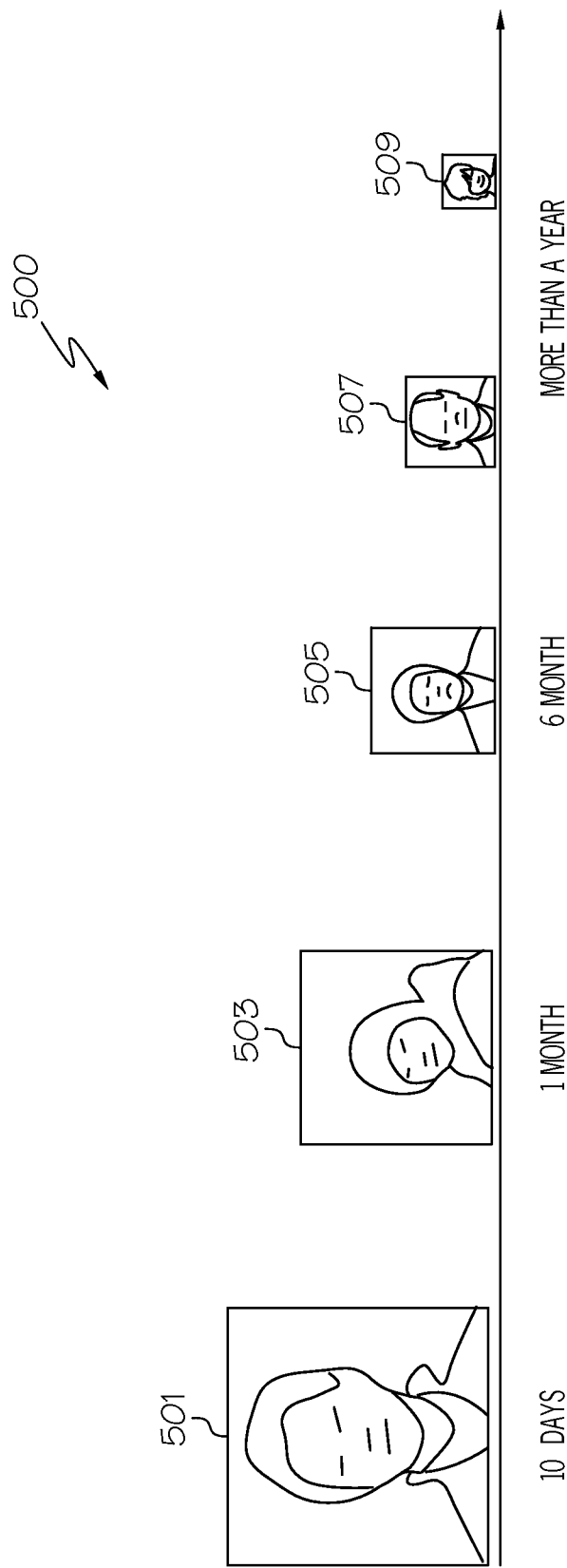
FIG. 5 illustrates a diminution of photos of e-mail users according to their interactive history with a user.

Returning again to FIG. 2, in one embodiment of the present invention one or more processors modifies a size of each of the photos in the e-mail GUI according to how long a latest e-mail from the system user to a person depicted in each photo remains unread by the person depicted in the photo (block 212). As described in block 214, in one embodiment of the present invention one or more processors modifies a size of each of the photos in the e-mail GUI according to how long a latest e-mail to the system user from a person depicted in each photo remains unread by the system user. For example, consider now a timeline 500 in FIG. 5, which illustrates a diminution of photos of e-mail users according to their interactive history with a user. Photo 501 (of the same person represented by photo 301 in FIG. 3) depicts a person whose e-mail was received (or sent) only ten days ago, but remains unread. As depicted in FIG. 5, photo 501 is much larger than photo 301 in FIG. 3, thus indicating that the e-mail received/sent by this person is relatively fresh/new. However, an e-mail to/from the person depicted in photo 503 (for the same person shown in photo 303 in FIG. 3) has gone unread for a month. Thus, this person's photo 503 is smaller than photo 501 indicating that whatever this person has sent/received is lessening in importance, due to becoming more stale/old. Likewise, the photos 505, 507, and 509 (of persons depicted in corresponding photos 305, 307, and 309 in FIG. 3) are diminishing even further, based on the staleness/age of the unread/unopened e-mails to/from the depicted persons.

While the photos shown in FIG. 5 get smaller as time passes, in another embodiment of the present invention the photos of the e-mail participants (e.g., senders) get larger as time passes on the timeline, thus reflecting that there is a need to "catch up" on the old unread e-mails.

In one embodiment, the resized photos (501, 503, 505, 507, 509) depicted in FIG. 5 are then used to replace their corresponding photos (301, 303, 305, 307, 309) that were originally depicted in FIG. 3, thus providing a visual cue to a system user of the e-mail GUI 300 of the staleness of the unread e-mails from/to the persons depicted in the photos.

Returning now to FIG. 2, block 216 describes one or more processors generating and displaying a first timeline, a second timeline, and a third timeline with photos of the e-mail users, where the first timeline shows a time and date that the predefined "high importance" e-mails were communicated between an e-mail user depicted in one of the photos and the system user; the second timeline shows a time and date that the normal "To" e-mails were communicated between an e-mail user depicted in one of the photos and the system user; and the third timeline shows a time and date that the normal "CC" e-mails were communicated between an e-mail user depicted in one of the photos and the system user.

Figure 6:
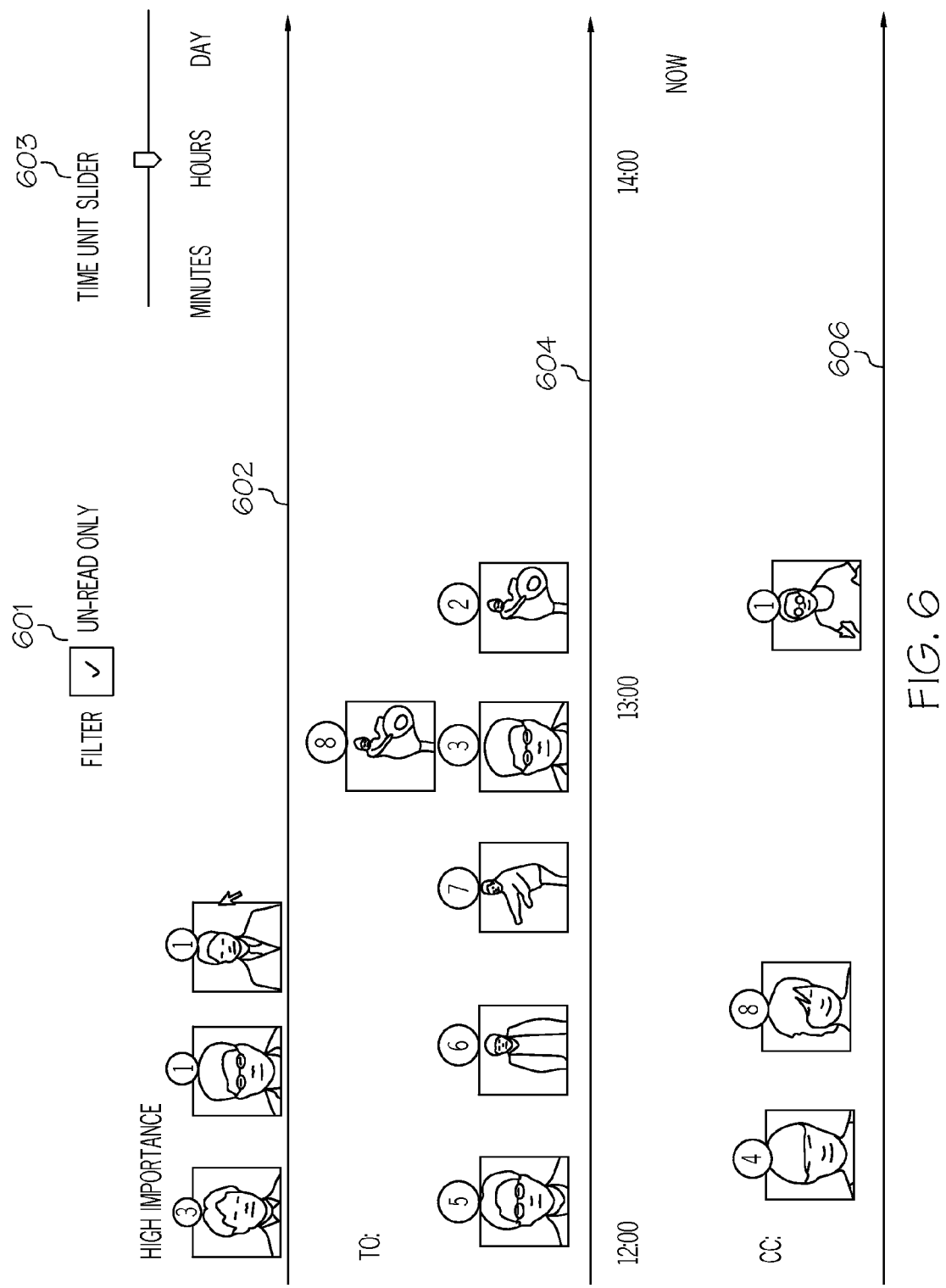
FIG. 6 depicts photos of e-mail users on timelines related to when e-mails were sent to and/or from a particular user.

For example, consider now FIG. 6, which depicts photos of e-mail users on timelines related to when e-mails were sent to and/or from a particular user. Thus, a first timeline 602 shows photos of three e-mail users who sent/received different numbers of "high importance" e-mails two hours earlier (at 12:00). These e-mails have been designated as "high importance" either by the sender (checking a "high importance" flag/designation when sending the e-mail), or by a computer system (which determines, based on rules about a content of the e-mail, rules regarding the parties who are sending/receiving the e-mail, etc. that a specific e-mail is of "high importance"). Thus, one or more processors generates and displays the first timeline 602 with the photos of the e-mail users, wherein the first timeline shows a time and date that the predefined "high importance" e-mails were communicated between an e-mail user depicted in one of the photos and the system user.

Similarly, a second timeline 604 depicts photos of persons who sent e-mails (via a "To" field) to the system user (i.e., the person who is viewing the timeline 604 and/or the e-mail GUI 300 in FIG. 3). The photos are encoded with the circles showing how many unread e-mails are pending with these pictured persons, and how "stale" the e-mails are. Note that all of the e-mails represented on second timeline 604 are for e-mails that 1) were sent to the system user in the "To" field (indicating that the system user is the primary designated recipient of the e-mail) of the e-mail program, and 2) remain unread. Thus, one or more processors generates and displays a second timeline with the photos of the e-mail users, wherein the second timeline shows a time and date that the normal "To" e-mails were communicated between an e-mail user depicted in one of the photos and the system user.

Similarly, a third timeline 606 depicts photos of persons who sent e-mails (via a "CC" field) to the system user (i.e., the person who is viewing the timeline 604 and/or the e-mail GUI 300 in FIG. 3). The photos are encoded with the circles showing how many unread e-mails are pending with these pictured persons, and how "stale" the e-mails are. Note that all of the e-mails represented on third timeline 606 are for e-mails that 1) were sent to the system user in the "CC" field (indicating that the system user is not the primary recipient, but rather just someone who is being "copied" with a copy of the e-mail) of the e-mail program, and 2) remain unread. Thus, one or more processors generates and displays a third timeline with the photos of the e-mail users, wherein the third timeline shows a time and date that the normal "CC" e-mails were communicated between an e-mail user depicted in one of the photos and the system user.

Note that in FIG. 6, field 601 allows the system user (i.e., the person viewing and using the timelines shown in FIG. 6) to represent only unread e-mails. Furthermore, a slider 603 allows the system user to adjust the timelines' units of time (e.g., minutes, hours, days, etc.).

Returning to FIG. 2, the process ends at terminator block 218.

Note that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of managing electronic mail (e-mail), the method comprising:
generating, by one or more processors, an e-mail Graphical User Interface (GUI) comprising a first set of photos of e-mail users, wherein the e-mail GUI is on a system, wherein the photos in the first set depict e-mail users, and wherein the e-mail GUI is displayed to a system user;
appending, by one or more processors, a visual cue to at least one photo in the first set in the e-mail GUI, wherein the visual cue describes how many e-mails between a photo-depicted e-mail user and the system are unread, wherein the visual cue comprises a first visual cue, a second visual cue, and a third visual cue, wherein the first visual cue describes how many predefined "high importance" e-mails between the photo-depicted e-mail user and the system user are unread, wherein the second visual cue describes how many normal "To" e-mails between the photo-depicted e-mail user and the system user are unread, and wherein the third visual cue describes how many normal "CC" e-mails between the photo-depicted e-mail user and the system user are unread;
generating and displaying on the e-mail GUI, by one or more processors, a first timeline with the first set of photos of the e-mail users, wherein the first timeline shows a time and date that the predefined "high importance" e-mails were communicated between an e-mail user depicted in one of the photos and the system user;
generating and displaying on the e-mail GUI, by one or more processors, a second timeline with the first set of photos of the e-mail users, wherein the second timeline shows a time and date that the normal "To" e-mails were communicated between an e-mail user depicted in one of the photos and the system user;
generating and displaying on the e-mail GUI, by one or more processors, a third timeline with the first set of photos of the e-mail users, wherein the third timeline shows a time and date that the normal "CC" e-mails were communicated between an e-mail user depicted in one of the photos and the system user;
displaying on the e-mail GUI, by one or more processors, a timeline that depicts a past span of time;
displaying on the timeline, by one or more processors, a second set of photos, the photos in the second set depicting persons who have sent unread e-mails to the system user during the past span of time, wherein the unread e-mails have not been read by the system user; and
reducing, by one or more processors, sizes of the photos of the persons based on ages of the unread e-mails that the persons have sent to the system user over the past span of time.

2. The method of claim 1, further comprising:
determining, by one or more processors, an e-mail frequency between the e-mail users and the system user based on historical e-mail communication records;
arranging, by one or more processors, each of the photos in the first set in the e-mail GUI according to a determined e-mail frequency between the system user and persons depicted in the photos.

3. The method of claim 1, further comprising:
modifying, by one or more processors, a size of each of the photos in the first set in the e-mail GUI according to how long a latest e-mail from the system user to a person depicted in each photo remains unread by the person depicted in said each photo.

4. The method of claim 1, further comprising:
modifying, by one or more processors, a size of each of the photos in the first set in the e-mail GUI according to how long a latest e-mail to the system user from a person depicted in each photo remains unread by the system user.

5. The method of claim 1, further comprising:
modifying, by one or more processors, a size of each of the photos in the first set in the e-mail GUI according to a frequency of e-mail exchanges between the system user and a person depicted in said each of the photos in the e-mail GUI.

6. The method of claim 1, further comprising:
displaying, by one or more processors, unsorted photos of the e-mail users in an unconfigured area on the e-mail GUI;
receiving, by one or more processors, a user input that selects an option for sorting the unsorted photos of the e-mail users according to work relationships between the e-mail users and the system user that is receiving the e-mail;

sorting, by one or more processors, the unsorted photos of the e-mail users according to the user input to create sorted photos of the e-mail users; and displaying, by one or more processors, the sorted photos of the e-mail users in a configured area on the e-mail GUI while still displaying the unsorted photos of the e-mail users in the unconfigured area.

7. The method of claim 1, further comprising:

receiving, by one or more processors, a user selection of a particular photo from the first set of photos of e-mail users, wherein the user selection is performed on the e-mail GUI by the system user; and in response to receiving the user selection of the particular photo, displaying, by one or more processors, one or more e-mails from a particular user who is depicted in the particular photo.

8. The method of claim 1, further comprising:

depicting on the e-mail GUI, by one or more processors, a user icon that represents the system user;

depicting on the e-mail GUI, by one or more processors, a first photo of a first e-mail user that sends e-mail to the system user, wherein the first e-mail user has a first historical pattern of high e-mail traffic between the first e-mail user and the system user;

depicting on the e-mail GUI, by one or more processors, a second photo of a second e-mail user that sends e-mail to the system user, wherein the second e-mail user has a second historical pattern of low e-mail traffic between the second e-mail user and the system user, wherein the low e-mail traffic is less than the high e-mail traffic;

enlarging on the e-mail GUI, by one or more processors, a size of the first photo based on the historical pattern of high e-mail traffic to create a larger first photo, wherein the larger first photo is of a first size;

reducing on the e-mail GUI, by one or more processors, a size of the second photo based on the historical pattern of low e-mail traffic to create a smaller second photo, wherein the smaller second photo is smaller than the first larger photo;

displaying on the e-mail GUI, by one or more processors, a short line that connects the larger first photo to the user icon; and displaying on the e-mail GUI, by one or more processors, a long line that connects the smaller second photo to the user icon, wherein the short line is shorter than the long line, and wherein lengths of the long line and the short line and sizes of the larger first photo and the smaller second photo combine to depict historical patterns of e-mail traffic with the system user and the first and second e-mail users.

9. The method of claim 1, further comprising:

appending, by one or more processors, an average reply time visual cue to at least one photo in the e-mail GUI, wherein the average reply time visual cue describes a historical average amount of time taken by a person depicted in a photo in the e-mail GUI to reply to an e-mail from the system user.

10. A computer program product for managing electronic mail (e-mail), the computer program product comprising a computer readable storage medium having program code embodied therewith, the program code readable and executable by a processor to perform a method comprising:

generating an e-mail Graphical User Interface (GUI) comprising a first set of photos of e-mail users, wherein the e-mail GUI is on a system, wherein the photos in the first set depict e-mail users, and wherein the e-mail GUI is displayed to a system user;

appending a visual cue to at least one photo in the first set in the e-mail GUI, wherein the visual cue describes how many e-mails between a photo-depicted e-mail user and the system are unread, wherein the visual cue comprises a first visual cue, a second visual cue, and a third visual cue, wherein the first visual cue describes how many predefined "high importance" e-mails between the photo-depicted e-mail user and the system user are unread, wherein the second visual cue describes how many normal "To" e-mails between the photo-depicted e-mail user and the system user are unread, and wherein the third visual cue describes how many normal "CC" e-mails between the photo-depicted e-mail user and the system user are unread;

generating and displaying, on the e-mail GUI, a first timeline with the first set of photos of the e-mail users, wherein the first timeline shows a time and date that the predefined "high importance" e-mails were communicated between an e-mail user depicted in one of the photos and the system user;

generating and displaying, on the e-mail GUI, a second timeline with the first set of photos of the e-mail users, wherein the second timeline shows a time and date that the normal "To" e-mails were communicated between an e-mail user depicted in one of the photos and the system user;

generating and displaying, on the e-mail GUI, a third timeline with the first set of photos of the e-mail users, wherein the third timeline shows a time and date that the normal "CC" e-mails were communicated between an e-mail user depicted in one of the photos and the system user;

displaying, on the e-mail GUI, a timeline that depicts a past span of time;

displaying, on the timeline, a second set of photos, the photos in the second set depicting persons who have sent unread e-mails to the system user during the past span of time, wherein the unread e-mails have not been read by the system user; and reducing sizes of the photos of the persons based on ages of the unread e-mails that the persons have sent to the system user over the past span of time.

11. The computer program product of claim 10, wherein the method further comprises:

determining an e-mail frequency between the e-mail users and the system user based on historical e-mail communication records;

arranging each of the photos in the first set in the e-mail GUI according to a determined e-mail frequency between the system user and persons depicted in the photos.

12. The computer program product of claim 10, wherein the method further comprises:

modifying a size of each of the photos in the first set in the e-mail GUI according to how long a latest e-mail from the system user to a person depicted in each photo remains unread by the person depicted in said each photo.

13. The computer program product of claim 10, wherein the method further comprises:

modifying a size of each of the photo in the first set in the e-mail GUI according to how long a latest e-mail to the system user from a person depicted in each photo remains unread by the system user.

14. The computer program product of claim 10, wherein the method further comprises:
modifying a size of each of the photos in the first set in the e-mail GUI according to a frequency of e-mail exchanges between the system user and a photo-person depicted in said each of the photos in the e-mail GUI.

15. A computer system comprising:
a processor, a computer readable memory, and a computer readable storage medium;
first program instructions to generate an e-mail Graphical User Interface (GUI) comprising a first set of photos of e-mail users, wherein the e-mail GUI is on a system, wherein the photos in the first set depict e-mail users, and wherein the e-mail GUI is displayed to a system user;
second program instructions to append a visual cue to at least one photo in the first set in the e-mail GUI, wherein the visual cue describes how many e-mails between a depicted e-mail user and the system are unread, wherein the visual cue comprises a first visual cue, a second visual cue, and a third visual cue, wherein the first visual cue describes how many predefined "high importance" e-mails between the photo-depicted e-mail user and the system user are unread, wherein the second visual cue describes how many normal "To" e-mails between the photo-depicted e-mail user and the system user are unread, and wherein the third visual cue describes how many normal "CC" e-mails between the photo-depicted e-mail user and the system user are unread;
third program instructions to generate and display, on the e-mail GUI, a first timeline with the first set of photos of the e-mail users, wherein the first timeline shows a time and date that the predefined "high importance" e-mails were communicated between an e-mail user depicted in one of the photos and the system user;
fourth program instructions to generate and display, on the e-mail GUI, a second timeline with the first set of photos of the e-mail users, wherein the second timeline shows a time and date that the normal "To" e-mails were communicated between an e-mail user depicted in one of the photos and the system user;
fifth program instructions to generate and display, on the e-mail GUI, a third timeline with the first set of photos of the e-mail users, wherein the third timeline shows a time and date that the normal "CC" e-mails were communicated between an e-mail user depicted in one of the photos and the system user;
sixth program instructions to display, on the e-mail GUI, a timeline that depicts a past span of time;
seventh program instructions to display, on the timeline, a second set of photos, the photos in the second set depicting persons who have sent unread e-mails to the system user during the past span of time, wherein the unread e-mails have not been read by the system user; and
eighth program instructions to reduce sizes of the photos of the persons based on ages of the unread e-mails that the persons have sent to the system user over the past span of time; and wherein the first, second, third, fourth, fifth, sixth, seventh, and eighth program instructions are stored on the computer readable storage medium and executed by the processor via the computer readable memory.

16. The computer system of claim 15, further comprising:
ninth program instructions to determine an e-mail frequency between the e-mail users and the system user based on historical e-mail communication records;
tenth program instructions to arrange each of the photos in the first set in the e-mail GUI according to a determined e-mail frequency between the system user and persons depicted in the photos; and wherein
the ninth and tenth program instructions are stored on the computer readable storage medium and executed by the processor via the computer readable memory.

17. The computer system of claim 15, further comprising:
ninth program instructions to modify a size of each of the photos in the first set in the e-mail GUI according to how long a latest e-mail from the system user to a person depicted in each photo remains unread by the person depicted in said each photo; and wherein
the ninth program instructions are stored on the computer readable storage medium and executed by the processor via the computer readable memory.

18. The computer system of claim 15, further comprising:
ninth program instructions to modify a size of each of the photos in the first set in the e-mail GUI according to how long a latest e-mail to the system user from a person depicted in each photo remains unread by the system user; and wherein
the ninth program instructions are stored on the computer readable storage medium and executed by the processor via the computer readable memory.

19. The computer system of claim 15, further comprising:
ninth program instructions to modify a size of each of the photos in the first set in the e-mail GUI according to a frequency of e-mail exchanges between the system user and a person depicted in said each of the photos in the e-mail GUI; and wherein
the ninth program instructions are stored on the computer readable storage medium and executed by the processor via the computer readable memory.

* * * * *